(12) United States Patent
Moribe et al.

(10) Patent No.: US 6,404,148 B1
(45) Date of Patent: Jun. 11, 2002

(54) SWITCHING APPARATUS FOR HORIZONTAL DRIVING PULSE

(75) Inventors: Hiroshi Moribe, Osaka; Nobuo Taketani, Hyogo; Hisao Morita, Osaka; Ryuichi Shibutani, Osaka; Hiroshi Ando, Osaka; Masahiro Takeshima, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/690,053

(22) Filed: Oct. 16, 2000

(30) Foreign Application Priority Data

Oct. 15, 1999 (JP) .............................................. 11-293299

(51) Int. Cl.[7] ................................................ G09G 1/04
(52) U.S. Cl. ........................................ 315/371; 315/408
(58) Field of Search ................................ 315/370, 371, 315/396, 408, 387, 403

(56) References Cited

U.S. PATENT DOCUMENTS 4,952,850 A * 8/1990 Ogino et al. ................ 315/387

5,663,615 A * 9/1997 Ogino ........................ 315/371

* cited by examiner

Primary Examiner—Haissa Philogene
(74) Attorney, Agent, or Firm—Ratner & Prestia

(57) ABSTRACT

In a horizontal deflection circuit, a waveform response of a horizontal output pulse must be adequately taken into account before and after a switching of the horizontal output pulse so that the waveform does not lack in shape and does not lose continuity at the switching. A switching apparatus for a horizontal driving apparatus includes (a) a horizontal driving pulse generator which generates a horizontal driving pulse from a horizontal synchronization signal, (b) an alternative signal generator which outputs an alternative signal different from the horizontal driving pulse, (c) a horizontal output control device which determines a timing to switch between the horizontal driving pulse and the alternative signal, and (d) a switching device which switches an output pulse with a control signal which is output from the horizontal output control device. The switching device switches only when both the output signal from the horizontal driving pulse generator and the output signal from the alternative signal generator change from a low level to a high level at the same time.

3 Claims, 3 Drawing Sheets

SWITCHING APPARATUS FOR HORIZONTAL DRIVING PULSE

FIELD OF THE INVENTION

The present invention relates to a switching apparatus for a horizontal driving pulse which is input into a horizontal deflection circuit in a television receiver.

BACKGROUND OF THE INVENTION

Broadcast satellite (BS) digital broadcasting has ushered in the use of a television (TV) receiver in recent years, and importance is placed on development of the capability that the TV is provided for various kinds of input signals. A conventional phase control device, which controls a horizontal driving pulse in a horizontal deflection circuit, is described as follows.

FIG. 3 is a block diagram of a conventional phase control device which controls a horizontal driving pulse. Frequency discriminator 1 discriminates a type (e.g. an interlace signal, or a progressive signal) of input video signal (not shown) from a frequency of input horizontal synchronization (hereinafter referred to as horizontal sync, or H. Sync) signal A. Reference phase signal generator 2 outputs reference phase signal B which provides a phase of a horizontal deflection pulse optimized for the input video signal responsively to horizontal sync signal A and discrimination result J of frequency discriminator 1 (an output signal of discriminator 1). The phase of the horizontal deflection pulse determines the retrace-time of a scanning line. Timing signal generator 3 generates timing signal C, which is responsive to the input video signal, based on the horizontal sync signal A and the discrimination result J of the frequency discriminator 1. Sawtooth wave generator 4 outputs sawtooth wave signal D which has a phase responsive to timing signal C. Multiplier 6 multiplies reference phase signal B by an output signal of comparator 5, and outputs multiplier output G. Low-pass filter (LPF) 7 makes multiplier output G smoothed into average voltage Vav, which is a DC voltage, and outputs average voltage Vav. Comparator 8 compares sawtooth wave signal D with average voltage Vav, and outputs phase control signal H. Signal H is at a high level when sawtooth wave signal D is larger than average voltage Vav, and is at a low level in the other period. Horizontal driving pulse generator 20 outputs horizontal driving pulse I. Pulse I is synchronized with a rising edge of phase control signal H, and has a duty cycle which is determined by discrimination result J of frequency discriminator 1. Horizontal deflection circuit 13 receives horizontal driving pulse I, and outputs horizontal deflection pulse E. Comparator 5 compares horizontal deflection pulse E with a specified reference voltage, and generates signal F. Signal F is at a high level when a voltage of horizontal deflection pulse E is equal to or larger than the reference voltage.

Timing signal generator 3 and sawtooth wave generator 4 constitute a sawtooth wave generator unit. The unit outputs a sawtooth wave signal having a phase responsive to a type of input video signal which is extracted from the horizontal sync signal. Comparator 5, multiplier 6, and LPF 7 constitute a phase difference voltage detector. The detector outputs a phase difference voltage which is the DC voltage (average voltage Vav) responsive to a phase difference between reference phase signal B and horizontal deflection pulse E.

Furthermore, comparator 8 compares sawtooth wave signal D with phase difference voltage Vav, and outputs a phase control signal, which is used for the horizontal driving pulse to have a phase corresponding to the phase difference voltage. Alternative signal generator 14 generates and outputs an alternative signal with free running clock pulse generated therein. The alternative signal is asynchronous to an output signal of horizontal driving pulse generator 20. Horizontal output controller 16 detects whether an operation of a frequency change accompanying an input video signal change is in progress or not, and whether an operation of a power-on is in progress or not. Switching circuit 15 outputs the alternative signal to horizontal deflection circuit 13 while the operation of the frequency change is in progress or the operation of the power-on is in progress. The alternative signal is alternative to an output signal from horizontal driving pulse generator 20.

The horizontal output controller switches an input signal of horizontal deflection circuit 13 between the output of the horizontal driving pulse generator and the output of the alternative signal generator. The apparatus having components mentioned above may malfunction for various reasons, for example, a signal waveform lacks in shape, a signal waveform loses continuity at the switching operation mentioned above, and so on. A horizontal driving transistor in the horizontal deflection circuit breaks if a waveform response before and after the switching operation is not taken into account.

SUMMARY OF THE INVENTION

The present invention relates to a switching apparatus for a horizontal driving pulse which is input into a horizontal deflection circuit outputing a horizontal deflection pulse. The switching apparatus comprises: (a) a horizontal driving pulse generator which produces a horizontal driving pulse from a horizontal synchronization signal; (b) a horizontal deflection circuit which carries out a horizontal deflection with the horizontal driving pulse; (c) an alternative signal generator which outputs an alternative signal which is different from the horizontal driving pulse; (d) a horizontal output control device which determines the time to switch between the horizontal driving pulse and the alternative signal; and (e) a switching device which switches an output pulse with a control signal which is output by the horizontal output control device. The switching device switches only when both the output signal from the horizontal driving pulse generator and the output signal from the alternative signal generator change from a low level to a high level at the same time.

The switching apparatus of the present invention allows the waveform of the horizontal driving pulse not to lack in shape and not to lose continuity at the switching operation. As a result, the output signal waveform of the switching apparatus keeps continuity before and after the switching operation, and the horizontal deflection circuit does not have malfunctions which are a breakage of the horizontal driving transistor and the like.

DESCRIPTION OF THE PREFERRED EMBODIMENT

Figure 1:
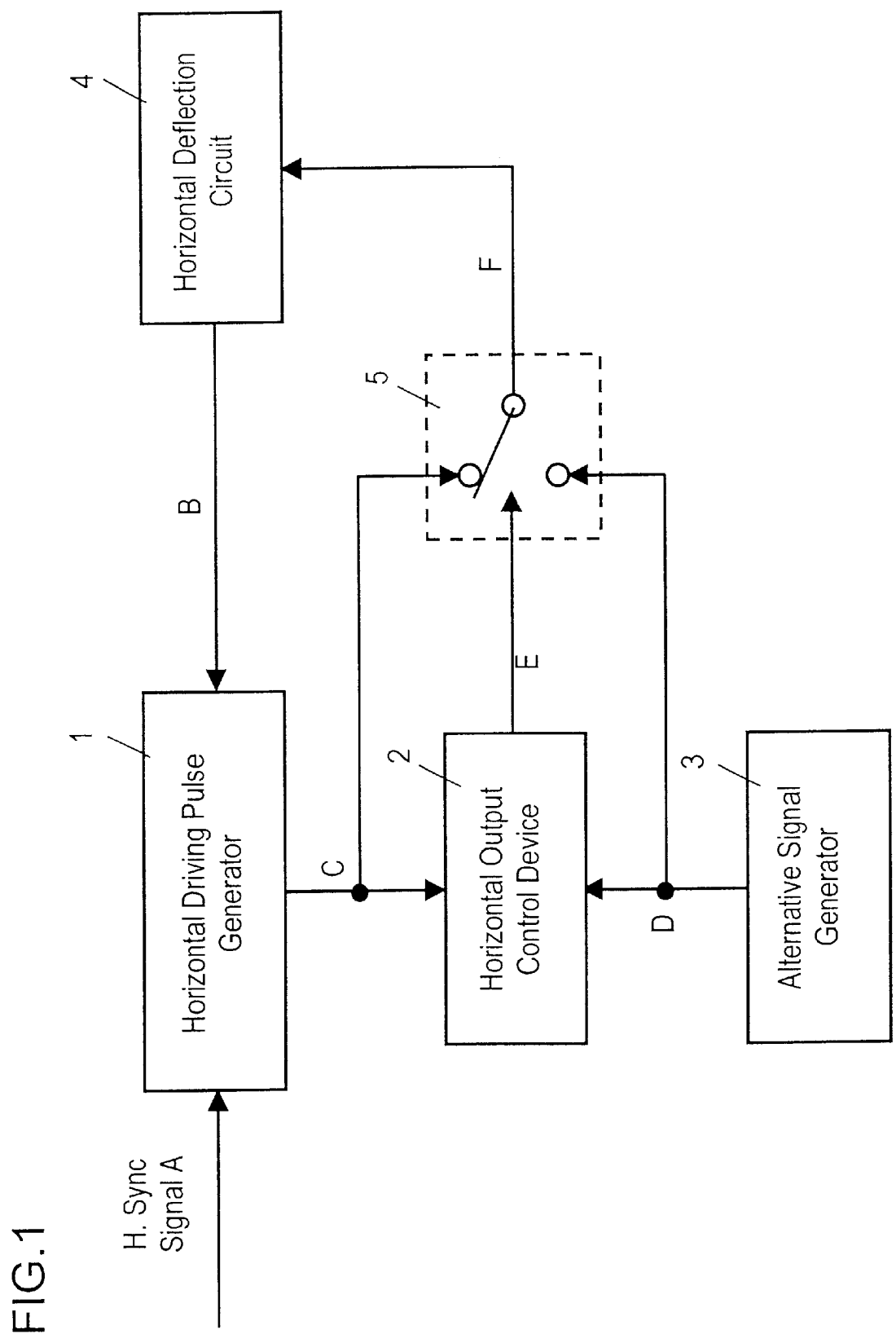
FIG. 1 is a block diagram of a switching apparatus for a horizontal driving pulse in accordance with an exemplary embodiment of the present invention.

FIG. 1 is a block diagram of a switching apparatus for a horizontal driving pulse in accordance with an exemplary embodiment of the present invention.

Horizontal driving pulse generator 1 generates driving pulse C, a phase of which is locked to horizontal synchronization signal A and output signal B from horizontal deflection circuit 4. Alternative signal generator 3 generates alternative signal D, which is asynchronous to driving pulse C, with free running clock pulse generated therein, and outputs the alternative signal. The output pulse signal from alternative signal generator 3 can be adjusted in frequency and duty cycle.

Adjusting the frequency and the duty cycle allows a phase control device to have a horizontal driving pulse corresponding to various horizontal frequencies . Horizontal output control device 2 generates control pulse E when a rising edge of driving pulse C coincides with that of alternative signal D. Switch 5 selects driving pulse C or alternative signal D depending on control pulse E, and inputs selected signal F into horizontal deflection circuit 4.

Figure 2:
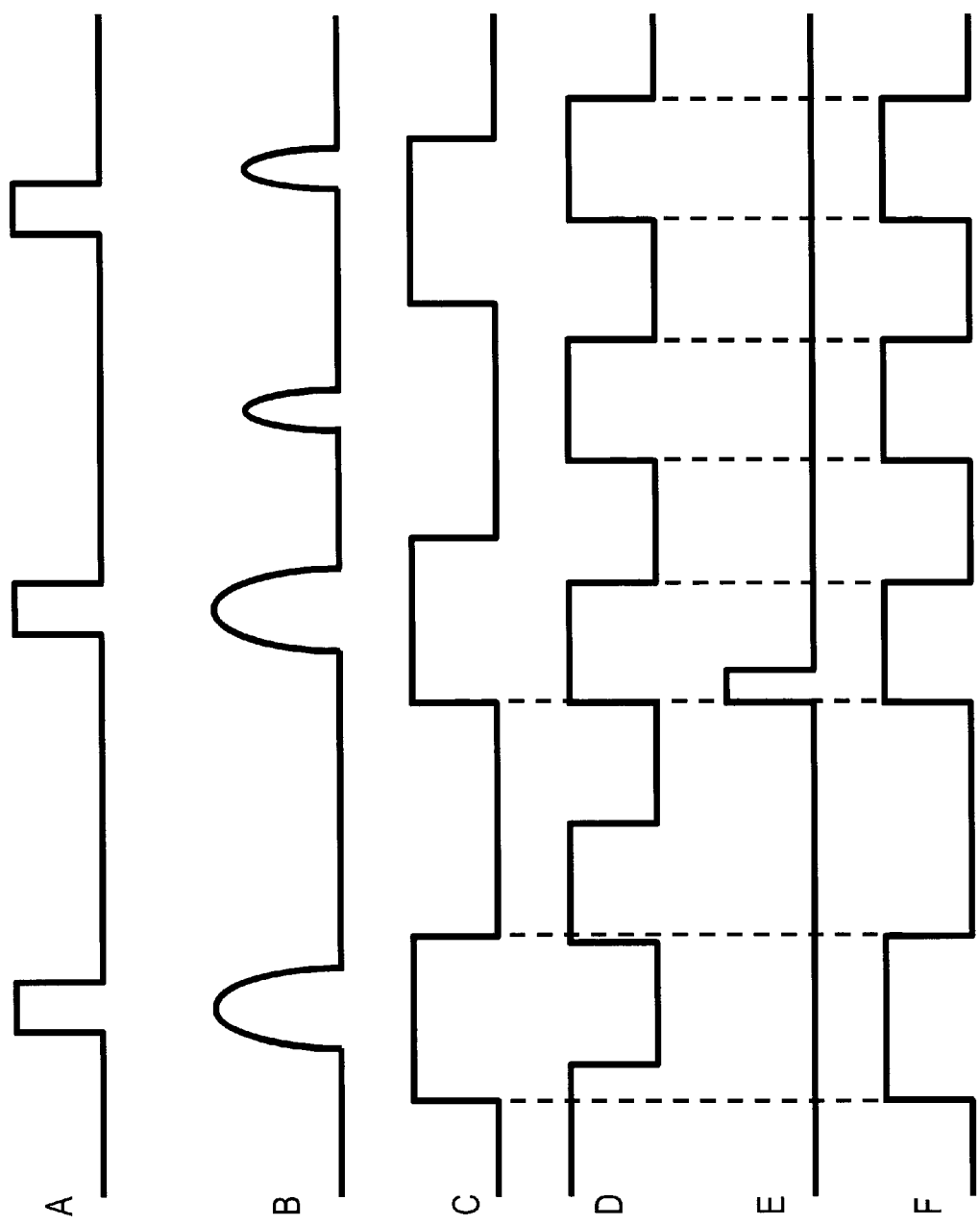
FIG. 2(A–F) shows waveforms of individual points in the switching apparatus for the horizontal driving pulse in accordance with the exemplary embodiment of the present invention.
Figure 3:
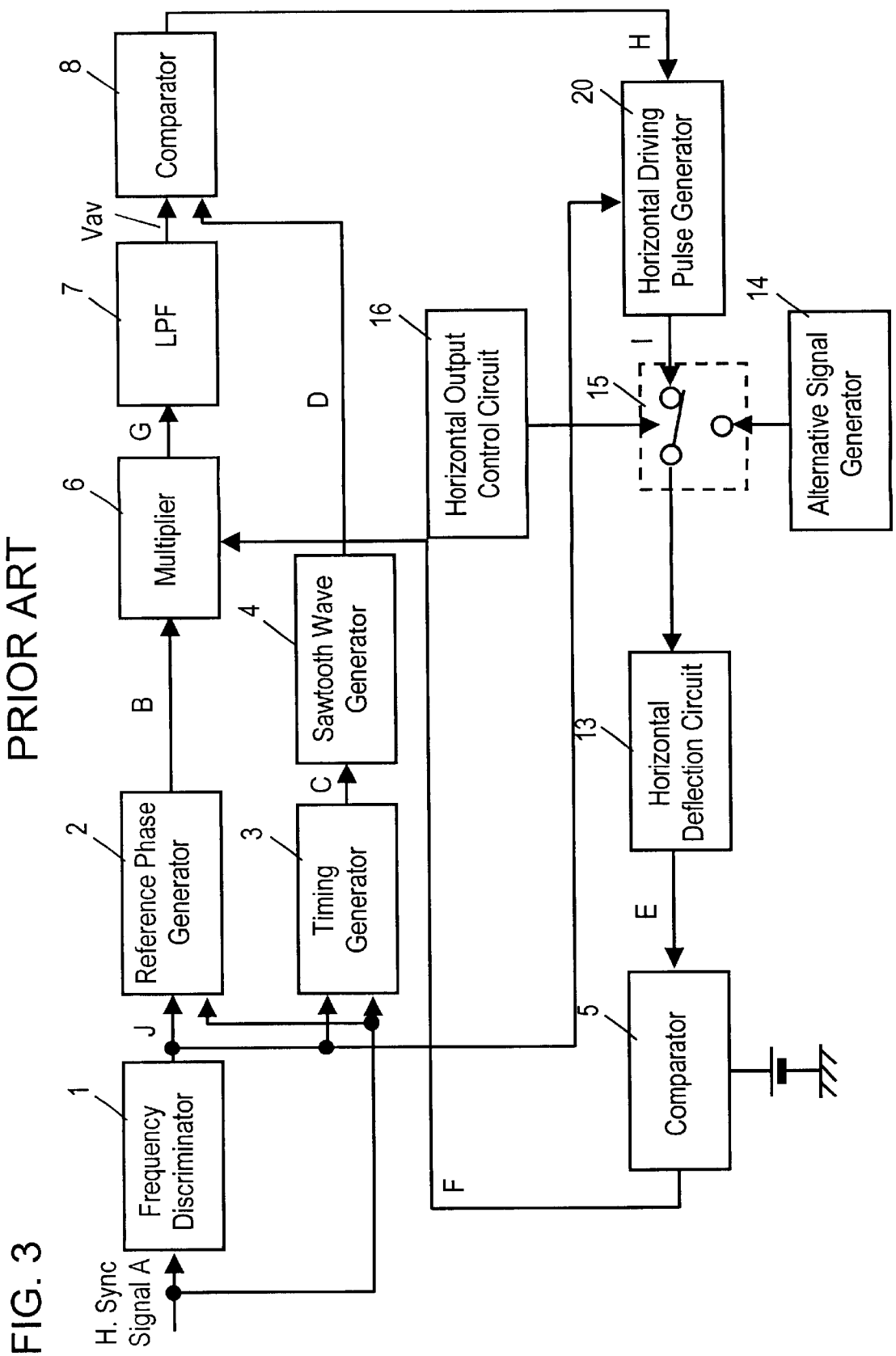
FIG. 3 is a block diagram of a conventional switching apparatus for a horizontal driving pulse.

Operation of the switching apparatus mentioned above for the horizontal driving pulse is described with reference to FIG. 2. FIG. 2 shows signal waveforms output from individual points in the switching apparatus for the horizontal driving pulse in accordance with the exemplary embodiment of the present invention.

In FIG. 2, driving pulse C is the driving pulse signal, a phase of which is locked to horizontal synchronization signal A and output signal B from horizontal deflection circuit 4. Alternative signal D or driving pulse C is selected by control pulse E. After that, the selected signal becomes waveform F. Control pulse E is generated only when a rising edge of driving pulse C coincides with that of alternative signal D. Hence it follows that waveform F does not lack in shape before and after the switching operation by the control pulse. That always keeps waveform F continuous. Consequently, the horizontal deflection circuit does not have malfunctions which are a breakage of the horizontal driving transistor and the like.

What is claimed is:

1. A switching apparatus comprising:
   (a) a horizontal driving pulse generator which generates a horizontal driving pulse from a horizontal synchronization signal;
   (b) an alternative signal generator which outputs an alternative signal different from the horizontal driving pulse;
   (c) switching means which selects one of the horizontal driving pulse and the alternative signal, and outputs a selected signal; and
   (d) a horizontal output control device which generates a control signal for said switching means to select, when both the horizontal driving pulse and the alternative signal transition from a low level to a high level substantially simultaneously, one of the horizontal driving pulse and the alternative signal, said horizontal output control device receiving the horizontal driving pulse generated by said horizontal driving pulse generator and the alternative signal generated by the alternative signal generator.

2. The switching apparatus as defined in claim 1, wherein the alternative signal is adjusted in a frequency and a duty cycle.

3. The switching apparatus of claim 1, wherein the switching apparatus is used with a horizontal deflection circuit, said horizontal deflection circuit carrying out a horizontal deflection with the horizontal driving pulse, said horizontal deflection circuit receiving an output signal from the switching means.

\* \* \* \* \*